(12) United States Patent
Mak (10) Patent No.: US 10,666,776 B1
(45) Date of Patent: May 26, 2020

(54) METHOD, APPARATUS, STORAGE MEDIUM AND TERMINAL DEVICE FOR CONTROLLING DEVICE OPERATION

(71) Applicant: Wang Fat Mak, Hong Kong (HK)

(72) Inventor: Wang Fat Mak, Hong Kong (HK)

( * ) Notice: Subject to any disclaimer, the term of this patent is extended or adjusted under 35 U.S.C. 154(b) by 0 days.

(21) Appl. No.: 16/371,799

(22) Filed: Apr. 1, 2019

(51) Int. Cl.
*H04L 29/06* (2006.01)
*H04L 29/08* (2006.01)

(52) U.S. Cl.
CPC ............. *H04L 69/22* (2013.01); *H04L 67/12* (2013.01); *H04L 69/28* (2013.01)

(58) Field of Classification Search
CPC . H04L 5/14; H04L 5/1423; H04L 5/16; H04L 12/56; H04L 2012/56; H04W 80/04; H04W 8/26
USPC ................................. 370/349, 389, 278, 282
See application file for complete search history.

(56) References Cited

U.S. PATENT DOCUMENTS

| 8,508,343 | B2 * | 8/2013 | Ryoo | .................. G06K 7/0008 340/10.1 |
| 2008/0212661 | A1 * | 9/2008 | Okada | ...................... G07C 7/00 375/219 |

\* cited by examiner

*Primary Examiner* — Brenda H Pham
(74) *Attorney, Agent, or Firm* — W&K IP (57) ABSTRACT

The invention provides a method, device, storage medium and terminal device for controlling device operation, the method including: receiving a control signal sent by the control device, where the data structure of the control signal comprises a preamble, a header and a data packet in sequence, the preamble comprises an operating frequency, and the data packet comprises a control command; reading information from the control signal according to an arrangement timing of the control signal; when the preamble is read, adjusting an operating frequency of the receiving device according to the operating frequency included the preamble; when the header is read, the data packet is sampled according to a set sampling duration; and the sampled control command is executed according to the adjusted operating frequency. With the present invention, the control quality of the control signal is improved.

12 Claims, 5 Drawing Sheets

METHOD, APPARATUS, STORAGE MEDIUM AND TERMINAL DEVICE FOR CONTROLLING DEVICE OPERATION

TECHNICAL FIELD

The subject matter herein generally relates to the field of computer technologies, in particular to a method, an apparatus, a storage medium, and a terminal device for controlling the device operation.

BACKGROUND

Figure 1:
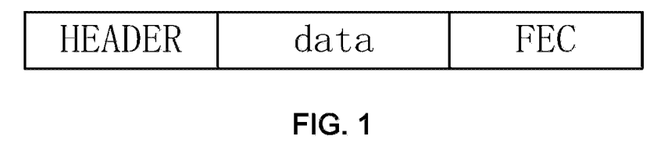
FIG. 1 is a schematic structural diagram of a communication protocol according to one embodiment of the prior art.

In the field of communication technology, a communication protocol used between a transmitting device and a receiving device usually comprises a header, a data packet, and Forward Error Correction (FEC). The data packet can include control commands, control parameters, and the like. See FIG. 1 for details.

In an amusement remote control vehicle system, for example, a remote control car, a remote control aircraft, a remote control ship, etc., the remote control enthusiast transmits a control signal to the receiving device, that is, the above-described remote control vehicle, through a transmitting device (for example, a remote controller). The information contained in the control signal can be as described in the aforementioned communication protocol. Wherein, the control command of the control signal is encoded in the data packet. The receiving device parses the data packet in the control signal to obtain a control command. The receiving device then operates in accordance with the control command. For example, adjusting the speed or direction of the receiving device.

Currently, the transmission quality of the control signal is largely dependent on the transmission speed and the accuracy of frequency matching between the signal being transmitted and the receiving device. The receiving device operates on the operating frequency of the oscillating crystal mounted in the circuitry of the receiving device. However, in order to reduce the cost of the device, a low-cost, low-quality oscillating crystal is usually employed. This type of oscillating crystal has a large error in the operating frequency between the receiving devices. Furthermore, if the control signals transmitted by the transmitting device are all of the same frequency, the frequency matching delay or the signal loss is likely to occur during the operation of the transmitting device to control the receiving device. That is, the entertainment remote control vehicle system is prone to runaway, and the loss of control rate is high.

And the response of the control signal is highly dependent on the sampling duration of the circuitry of the receiving device. However, in the conventional remote control signal receiving apparatus, the sampling duration of the sampling data of the receiving apparatus is fixed regardless of the length of the data packet in the control signal. The control commands are encoded in the data packet. For simple commands that do not exhaust the entire data packet, sampling the entire data packet wastes additional sampling time and is inefficient.

SUMMARY

The embodiment of the invention provides a method, an apparatus, a storage medium and a terminal device for controlling the device operation, so as to solve or alleviate one or more of the above technical problems in the prior art.

In the first aspect, an embodiment of the present invention provides a method for controlling the operation of a device, comprising: receiving a control signal sent by the control device, wherein a data structure of the control signal comprises a preamble, a header and a data packet in sequence, the preamble comprises an operating frequency, and the data packet comprises a control command; reading information from the control signal according to an arrangement timing of the control signal; when the preamble is read, adjusting an operating frequency of a receiving device according to the operating frequency included in the preamble; when the header is read, sampling the data packet according to a set sampling duration; and executing the sampled control command according to the adjusted operating frequency.

In some embodiments, the control signal further comprises a payload length of the control command in the data packet, the information of the payload length being ordered between the header and the data packet, and before sampling the data packet, the method further comprises: reading data encoded after the header to obtain the payload length; adjusting the sampling duration according to the read payload length.

In some embodiments, the operating frequency is encoded in the preamble in a binary format.

In some embodiments, the process of adjusting the sampling duration comprises: obtaining the data length of the data packet; and adjusting sampling duration according to a ratio of the payload length to the data length of the data packet.

In the second aspect, an embodiment of the present invention provides an apparatus for controlling a device, comprising: a signal receiving module, configured to receive a control signal sent by a control device, where the data structure of the control signal comprises a preamble, a header, and a data packet in sequence, the preamble including an operating frequency, and the data packet comprises control commands; an information reading module, configured to read information from the control signal according to an arrangement timing of the control signal; an operating frequency adjustment module, configured to: adjust an operating frequency of the receiving device according to the preamble including an operating frequency, when the preamble is read; a data sampling module, configured to sample the data packet according to a preset sampling duration when the header is read; and the control command execution module, configured to execute the sampled control command according to the adjusted working frequency.

In some embodiments, the control signal further comprises a payload length of the control command in the data packet, the information of the payload length being ordered between the header and the data packet, and before sampling the data packet, the apparatus further comprises: a payload length obtaining module, configured to read data encoded after the header to obtain the payload length; a sampling duration adjustment module, configured to adjust the sampling duration according to the read payload length.

In some embodiments, the operating frequency is encoded in the preamble in a binary format.

In some embodiments, the sampling duration adjustment module comprises: a packet length obtaining unit, configured to obtain the data length of the data packet; and a sampling duration determining unit, configured to adjust sampling duration according to a ratio of the payload length to the data length of the data packet.

The functions of the device may be implemented by hardware or by corresponding software implemented by hardware. The hardware or software comprises one or more modules corresponding to the functions described above.

In one possible design, the structure in which the control device operates comprises a processor and a memory for controlling a device operating apparatus to execute a program for controlling the device operation, the processor being configured to execute the program stored in the memory. The apparatus for controlling the device operation may further comprise a communication interface, configured to the apparatus for controlling the device operation communicating with other devices or communication networks.

In a third aspect, an embodiment of the present invention further provides a computer readable storage medium, configured to computer software instructions for controlling the device operation, including a program executing a method for controlling the device operation.

Any one of the above technical solutions has the following advantages or benefits:

In the embodiment of the present invention, the preamble may be set in the data structure of the control signal, and the working frequency of the control signal is encoded and transmitted to the receiving device by the preamble, and the receiving device may read the control signal for the first time. The preamble is read and parsed to obtain information of the corresponding working frequency. Then, the working frequency of the receiving device is adjusted according to the working frequency obtained by the analysis, so that the working frequency of the receiving device is synchronized with the operating frequency of the control signal, the delay of matching the subsequent control signals is avoided, and the situation of signal loss is avoided, and the control quality of the control signal is improved.

The above summary is for the purpose of illustration only and is not intended to be limiting. Further aspects, embodiments, and features of the present invention will be readily apparent from the description of the appended claims.

BRIEF DESCRIPTION OF THE DRAWINGS

FIG. 2-1 is a schematic diagram of an application environment of a method for controlling the operation of a device according to one embodiment of the present invention.

FIG. 2-2 is a schematic diagram of data transmission between a control device and a receiving device according to one embodiment of the present invention.

DETAILED DESCRIPTION OF THE INVENTION

In order to clarify the objectives, solutions, and advantages of the embodiments of the present invention, the technical solution of the embodiments of the present invention will be described clearly and completely accompanied with the figures.

Figure 21:
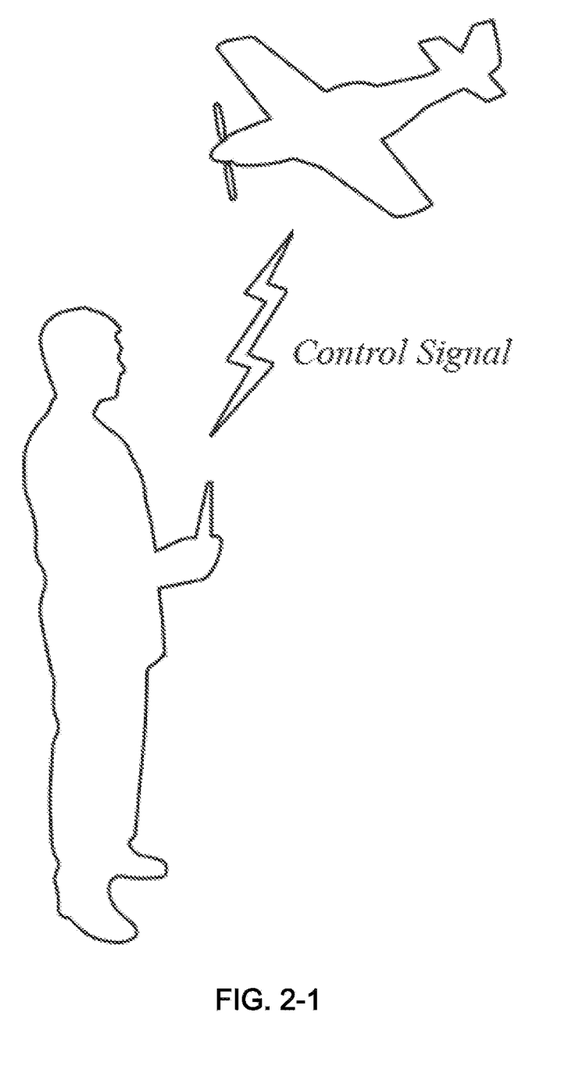
Figure 22:
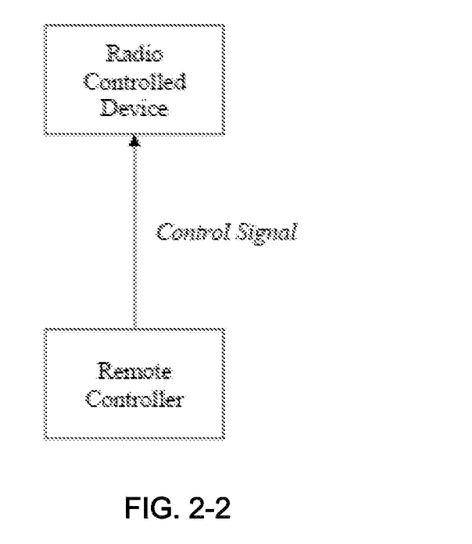

Referring to FIG. 2-1 and FIG. 2-2, an embodiment of the present invention provides an example of an application environment of a method for controlling device operation, which can be applied to an entertainment remote control vehicle system, for example, a remote control car, a remote control aircraft, a remote control ship, etc. The remote control enthusiast can send a control signal to the receiving device through the transmitting device. Taking FIG. 2-1 as an example, a remote control enthusiast can send a control signal to the remote control aircraft through the remote control. The control signal is generated in accordance with the data structure of the control signal provided in this embodiment. The data structure of the control signal comprises, in order of time, a preamble, a header, a payload length, a data packet, and a forward error correction coding, etc. For example, the data structure of the control signal can be as shown in FIG. The remote control aircraft parses the data of the control signal after receiving the control signal. Then, the remote control aircraft adjusts the operating frequency or sampling duration of the remotely controlled aircraft based on the information obtained by the analysis. And, the remote control aircraft operates according to the sampled control signal, that is, the sampled control signal is executed.

Figure 4:
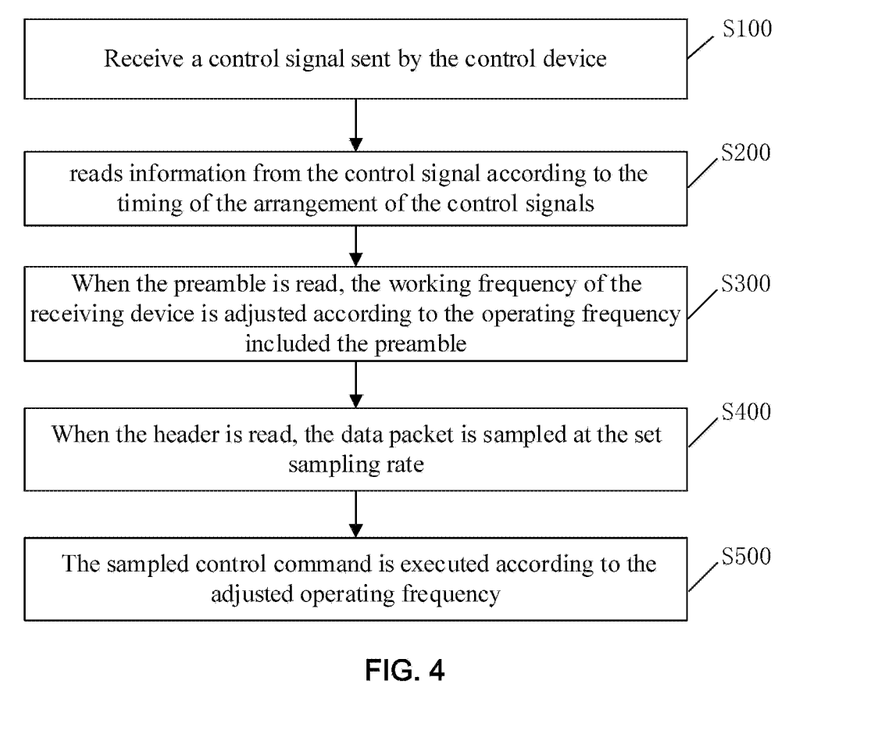
FIG. 4 is a schematic flow chart of a method for controlling the operation of a device according to one embodiment of the present invention.
Figure 5:
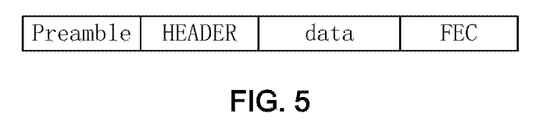
FIG. 5 is a schematic structural diagram of a data structure of a control signal according to one embodiment of the present invention.

Referring to FIG. 4, an embodiment of the present invention provides a method for controlling the operation of a device. This embodiment can be performed by a receiving device. The control device code generates a control signal and sends the control signal to the receiving device, as shown in FIG. 2-2. The receiving device performs the method provided in this embodiment according to the received control signal, and comprises steps S100 to S500, as follows:

S100. Receive a control signal sent by the control device. In some embodiments, as shown in FIG. 5, the data structure of the control signal may include a preamble, a header, and a data packet in sequence, the preamble comprises an operating frequency, and the data packet comprises a control command.

A data packet refers to a data unit in a communication transmission of the TCP/IP protocol with sufficient addressing information that can be independently transmitted from a source host (ie, a control device) to a destination host (ie, a receiving device).

The header refers to the header of the packet, which is attached to the special reserved field of the defined bit length in front of the packet in the protocol. When a data packet arrives at the receiving device, since the data packet is unpacked in the corresponding reverse order of each protocol layer, the field will be separated and discarded. When the receiving device reads the header, it means that the packet is read next. The receiving device can prepare to sampling the information of the data packet.

The preamble can encode the operating frequency of the control signal in binary or hexadecimal form and is placed at the forefront of the data structure of the control signal. In this way, the receiving device can know the working frequency of the control signal in the first time when reading the control signal, and adjust the working frequency of the receiving device in time, so that the receiving device can execute the read control command according to the synchronized working frequency. Then the receiving device can avoid getting out of control.

S200: reads information from the control signal according to the timing of the arrangement of the control signals.

In this embodiment, the data contained in the control signal is sorted bit by bit, and the receiving device reads the information in the control signal bit by bit in time series. For example, data is arranged in binary, octal, hexadecimal or other else bit by bit. This implementation can perform data transmission in binary, so that the data can be quickly read without transcoding.

S300: When the preamble is read, the working frequency of the receiving device is adjusted according to the operating frequency included the preamble.

Since the preamble is arranged at the forefront of the data structure of the control signal, the information read by the receiving device first is the preamble. The receiving device parses the forward step code to obtain the operating frequency of the control signal. The receiving device can adjust the operating frequency of the oscillating crystal in its circuit to coincide with the operating frequency of the control signal.

S400: When the header is read, the data packet is sampled at the set sampling duration.

In some embodiments, when the receiving device reads the header, the information in the data packet can be directly sampled directly at the sampling duration set by experience.

In some embodiments, when the receiving device reads the header, the corresponding sampling duration may be selected according to the information of the control device recorded in the header, The information in the packet is then sampled at the selected sampling duration. The information recorded in the header may include an identification of the control device, a serial number, and the like. Different control devices generate different data packets with different payload lengths, and the corresponding sampling durations are different. Therefore, the sampling duration can be selected by determining the identity of the control device.

S500: The sampled control command is executed according to the adjusted operating frequency.

In the embodiment of the present invention, the preamble may be set in the data structure of the control signal, and the working frequency of the control signal is encoded and transmitted to the receiving device by the preamble, and the receiving device may read the control signal for the first time. The preamble is read and parsed to obtain information of the corresponding working frequency. Then, the working frequency of the receiving device is adjusted according to the working frequency obtained by the analysis, and the working frequency of the receiving device is synchronized with the working frequency of the control signal in time, and the sampled control command can be executed according to the synchronous working frequency to avoid the receiving device out of control.

Figure 6:
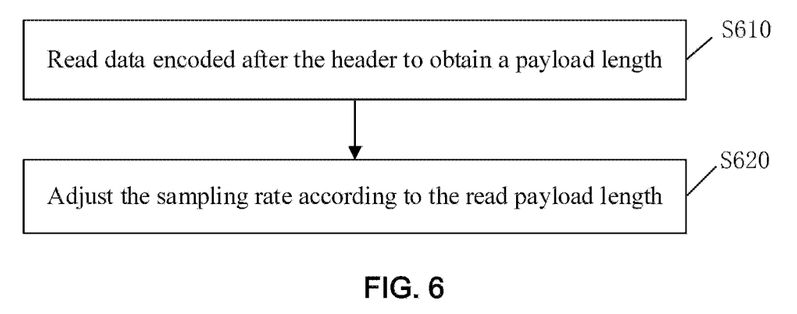
FIG. 6 is a schematic flow chart of a sampling duration adjustment process according to one embodiment of the present invention.

In some embodiments, the control signal may further include controlling the payload length of the command in the data packet, and the information of the payload length is ordered between the header and the data packet. See FIG. 3. The payload length information can describe the exact data length of the control command in the packet. For example, it can be expressed in bit length. Therefore, the receiving device can adjust the sampling duration before sampling the data packet. As shown in FIG. 6, the embodiment comprises step S610 and step S620, as follows:

S610. Read data encoded after the header to obtain a payload length.

S620: Adjust the sampling duration according to the read payload length.

Since the control command does not completely cover the data length of the entire packet, that is, the packet contains redundant or unnecessary information, the sampling duration can be determined according to the payload length. Determining the sampling duration and sampling the data packets in this way can avoid wasting extra time to sample the entire data packet and enhance the response efficiency of the control commands.

In some embodiments, the adjustment process of the sampling duration may include the receiving device obtaining the data length of the data packet, such as a bit length, from a header of the data packet. The receiving device adjusts the sampling duration according to the ratio of the payload length to the data length. For example, a duration in which a packet corresponding to the length of the data can be completely read is set in advance in the receiving device. Then, the preset duration is multiplied by the previously calculated ratio to obtain a value of the adjusted duration of the sample, when the sampling duration is adjusted.

Figure 3:
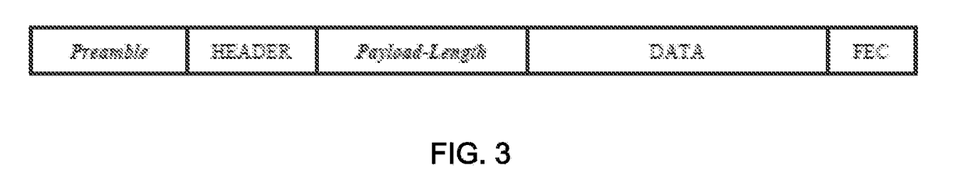
FIG. 3 is a schematic structural diagram of a data structure of a control signal according to one embodiment of the present invention.
Figure 7:
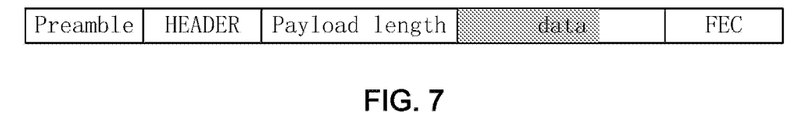
FIG. 7 is a schematic structural diagram of a data structure of a control signal according to one embodiment of the present invention.

The length of the entire data structure of the control signal remains unchanged. As shown in FIG. 3, the data length of the control signal is added by the data lengths of the components in "Preamble+Header+Payload length+Data+FEC". to make. The data length of each component remains the same, but the length of the valid data contained in the packet is variable. As shown in FIG. 7, the shaded portion of the packet is valid data, and the blank portion is redundant or empty. The payload length describes the length of the valid data. Therefore, the sampling duration is determined by the ratio of the payload length to the data length, and then the processing resources of the receiving device are adjusted at the sampling duration.

In this embodiment, the sampling duration or payload length can predict how much resources the processor of the receiving device needs to provide during the current cycle to perform the control signal. Compared with the fixed sampling duration of the prior art, the present embodiment can adjust the processor resources for processing the control signals according to the requirements of the control signals. For example, if the calculated sample rate is small, the processor can free up resources to handle other tasks. If the calculated sample rate is high, the processor can add resources to handle the task of this control signal.

Referring to FIG. 3, FIG. 5 and FIG. 7, the working principle and the beneficial effects of the data format of the control signal provided by the embodiment of the present invention are as follows:

Preamble in FIGS. 3, 5 and 7 can be used as a synchronization packet containing the operating frequency. The data of the non-Preambles in FIGS. 3, 5, and 7 are all pseudo-random code. For example, the headers, payload lengths, data packets, and forward error correction coding in FIGS. 3 and 7, and the header, data packet, and forward error correction coding of FIG. 5. The data modulation method provided by the embodiment of the present invention may be referred to as DSMP (Digital Spectrum Modulation Plus).

The control signal provided by the embodiment of the present invention includes information such as a Preamble, a header, a payload length, a data packet, and a forward error correction coding, and the information is sent to the receiving device in time series. If the preamble is not transmitted before the pseudo-random code is transmitted or the working frequency is not included in the preamble, the pseudo-random code is transmitted to the receiving device on the channel of the specific frequency, and the receiving device can receive the corresponding Data, otherwise the receiving device will receive control signals (i.e., pseudo-random code) sent by other control devices. Therefore, in this case, channels of other frequencies cannot be used even if they are idle. The reason is that if the pseudo-random coded data is transmitted by using channels of other frequencies, the pseudo-random coded data cannot be transmitted to the receiving device of the corresponding working frequency, but transmitted to other receiving devices. Further, there may be a case where the control device cannot control the receiving devices.

However, the control signal of the present application is modulated in DSMP, so that the preamble including the working frequency is transmitted before the pseudo-random code is transmitted. After receiving the preamble, the receiving device may identify the subsequently transmitted pseudo-random encode according to the operating frequency. Then, the pseudo-random code is transmitted on the channels of multiple frequencies, and can also reach the determined receiving device smoothly, and there is no packet loss phenomenon. Moreover, the utilization of channel allocation can be maximized since pseudo-random code can be transmitted over channels of multiple frequencies. On the other hand, the receiving device does not need to de-spread the encoded information, and only needs to perform simple matching on the preamble of the specific working frequency, so that the received data packet can be quickly detected, and the working efficiency of the receiving device is improved.

Figure 8:
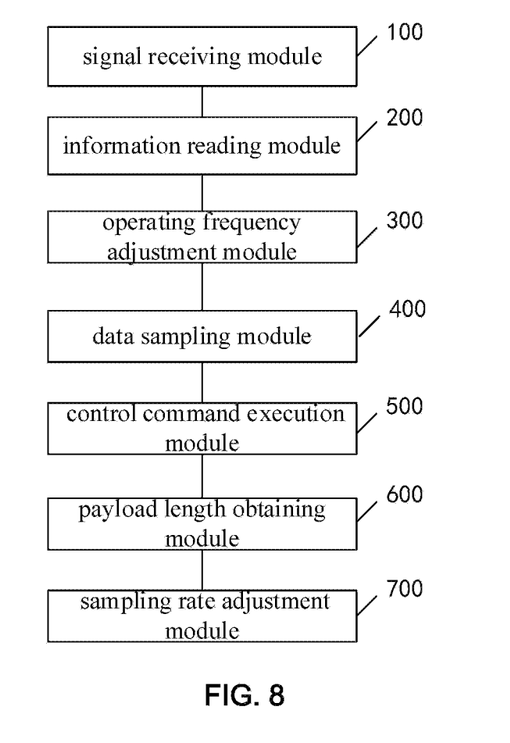
FIG. 8 is a schematic structural diagram of an apparatus for controlling the operation of a device according to one embodiment of the present invention.

Referring to FIG. 8, an embodiment of the present invention provides an apparatus for controlling a device, including:

an embodiment of the present invention provides an apparatus for controlling a device, including: a signal receiving module 100, configured to receive a control signal sent by the control device, where the data structure of the control signal comprises a preamble, a header, and a data packet in sequence, the preamble including an operating frequency, and the data the package comprises control commands; an information reading module 200, configured to read information from the control signal according to an arrangement timing of the control signal; an operating frequency adjustment module 300, configured to: when the preamble is read, adjust an operating frequency of the receiving device according to the preamble including an operating frequency; a data sampling module 400, configured to sample the data packet according to a set sampling duration when the header is read; and the control command execution module 500, configured to execute the sampled control command according to the adjusted working frequency.

In some embodiments, the control signal further comprises a payload length of the control command in the data packet, the information of the payload length being ordered Between the header and the data packet, and before sampling the data packet, the apparatus further comprises: a payload length obtaining module 600, configured to read data encoded after the header to obtain the payload length; an sampling duration adjustment module 700, configured to adjust the sampling duration according to the read payload length.

In some embodiments, the operating frequency is encoded in the preamble in a binary format.

In some embodiments, the apparatus for adjusting the sampling duration comprises: the sampling duration adjustment module comprises: a packet length obtaining unit, configured to obtain the data length of the data packet; and a sampling duration determining unit, configured to adjust sampling duration according to a ratio of the payload length to the data length of the data packet.

The functions of the device may be implemented by hardware or by corresponding software implemented by hardware. The hardware or software comprises one or more modules corresponding to the functions described above.

In one possible design, the structure in which the control device operates comprises a processor and a memory for controlling a device operating apparatus to execute a program for controlling the device operation, the processor being configured to execute the program stored in the memory. The apparatus for controlling the device operation may further comprise a communication interface, configured to the apparatus for controlling the device operation communicating with other devices or communication networks.

Figure 9:
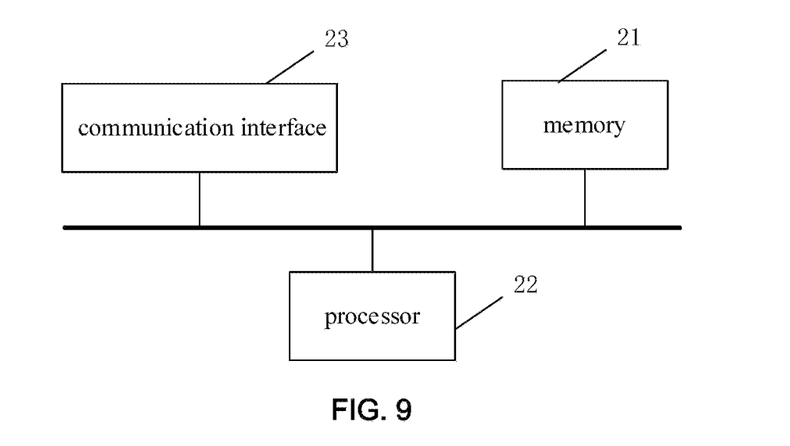
FIG. 9 is a schematic structural diagram of a terminal device according to one embodiment of the present invention.

The embodiment of the present invention further provides a terminal device for controlling the device operation. As shown in FIG. 9, the device comprises: a memory 21 and a processor 22. The memory 21 stores a computer program executable on the processor 22. A method of implementing the operation of the control device in the above embodiment when the processor 22 executes a computer program. The number of memories 21 and processors 22 may be one or more.

The device also comprises:

The communication interface 23 is used for communication between the processor 22 and an external device.

The memory 21 may include a high speed RAM memory and may also include a non-volatile memory such as at least one disk memory.

If the memory 21, the processor 22, and the communication interface 23 are independently implemented, the memory 21, the processor 22, and the communication interface 23 can be connected to each other through a bus and complete communication with each other. The bus may be an Industrial Standard Architecture (ISA) bus, a Peripheral Component (PCI) bus, or an Extended Industry Standard Component (EISA) bus. The bus can be divided into an address bus, a data bus, a control bus, and the like. For ease of representation, only one thick line is shown in FIG. 9, but it does not mean that there is only one bus or one type of bus.

Optionally, in a specific implementation, if the memory 21, the processor 22, and the communication interface 23 are integrated on one chip, the memory 21, the processor 22, and the communication interface 23 can complete communication with each other through the internal interface.

In the description of the present specification, the description with reference to the terms "one embodiment", "some embodiments", "example", "specific example", or "some examples" and the like means a specific feature described in connection with the embodiment or example. A structure, material or feature is included in at least one embodiment or example of the invention. Furthermore, the particular features, structures, materials, or characteristics described may be combined in a suitable manner in any one or more embodiments or examples. Moreover, those skilled in the art can combine the different embodiments or examples described in the specification and the features of the different embodiments or examples, without contradicting each other.

Moreover, the terms "first" and "second" are used for descriptive purposes only and are not to be construed as indicating or implying a relative importance or implicitly indicating the number of technical features indicated. Thus, features defining "first" and "second" may include at least one of the features, either explicitly or implicitly. In the description of the present invention, the meaning of "a plurality" is two or more, unless specifically defined otherwise Any process or method description in the flowcharts or otherwise described herein may be understood as a module, segment or portion of code representing executable instructions including one or more steps for implementing a particular logical function or process. And the scope of the preferred embodiments of the invention comprises additional implementations, in which the functions may be performed in a substantially simultaneous manner or in an opposite order depending on the functions involved, not in the order shown or discussed. Understood by those skilled in the art to which the embodiments of the present invention pertain.

The logic and/or steps represented in the flowchart or otherwise described herein, for example, may be considered as an ordered list of executable instructions for implementing logical functions, and may be embodied in any computer readable medium, Used in conjunction with, or in conjunction with, an instruction execution system, apparatus, or device (e.g., a computer-based system, a system including a processor, or other system that can fetch instructions from, and execute instructions from, an instruction execution system, apparatus, or device) or use with equipment. For the purposes of this specification, a "computer-readable medium" can be any apparatus that can be used, stored, communicated, propagated, or transmitted for use by an instruction execution system, apparatus, or apparatus, or in conjunction with such an instruction execution system, apparatus, or apparatus.

The computer readable medium of the embodiments of the present invention may be a computer readable signal medium or a computer readable storage medium or any combination of the two. More specific examples of computer readable storage media at least (non-exhaustive list) include the following: electrical connections (electronic devices) having one or more wires, portable computer disk cartridges (magnetic devices), random access memory (RAM)), read only memory (ROM), erasable editable read only memory (EPROM or flash memory), fiber optic devices, and portable read only memory (CDROM). In addition, the computer readable storage medium may even be a paper or other suitable medium on which the program can be printed, as it may be optically scanned, for example by paper or other medium, followed by editing, interpretation or, if appropriate, in other suitable manners. Processing is performed to obtain the program electronically and then stored in computer memory.

In an embodiment of the invention, a computer readable signal medium may comprise a data signal propagating in a baseband or as part of a carrier, carrying computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with an instruction execution system, an input method, or a device. Program code embodied on a computer readable medium can be transmitted by any suitable medium, including but not limited to wireless, wire, optical cable, radio frequency (RF), and the like, or any suitable combination of the foregoing.

It should be understood that portions of the invention may be implemented in hardware, software, firmware or a combination thereof. In the above-described embodiments, multiple steps or methods may be implemented in software or firmware stored in a memory and executed by a suitable instruction execution system. For example, if implemented in hardware, as in another embodiment, it can be implemented by any one or combination of the following techniques well known in the art: having logic gates for implementing logic functions on data signals. Discrete logic circuits, application specific integrated circuits with suitable combinational logic gates, programmable gate arrays (PGAs), field programmable gate arrays (FPGAs), etc.

A person skilled in the art can understand that all or part of the steps carried in the method of implementing the above embodiments are programs that can be executed by a program to instruct related hardware, and the program can be stored in a computer readable storage medium. When executed, one or a combination of the steps of the method embodiments is included.

In addition, each functional unit in each embodiment of the present invention may be integrated into one processing module, or each unit may exist physically separately, or two or more units may be integrated into one module. The above integrated modules can be implemented in the form of hardware or in the form of software functional modules. An integrated module, if implemented in the form of a software functional module and sold or used as a standalone product, may also be stored in a computer readable storage medium. The storage medium may be a read only memory, a magnetic disk or an optical disk, or the like.

The above is only a specific embodiment of the present invention, but the scope of the present invention is not limited thereto, and any variation or substitution can be easily conceived by those skilled in the art within the technical scope of the present disclosure. These should be covered by the scope of the present invention. Therefore, the scope of the invention should be determined by the scope of the claims.

I claim:

1. A method for controlling the operation of a device, wherein the method comprising:
   receiving a control signal sent by the control device, wherein a data structure of the control signal comprises a preamble, a header and a data packet in sequence, the preamble comprises an operating frequency, and the data packet comprises a control command;
   reading information from the control signal according to an arrangement timing of the control signal;
   when the preamble is read, adjusting an operating frequency of the receiving device according to the operating frequency included the preamble;
   when the header is read, sampling the data packet according to a set sampling duration; and
   executing the sampled control command according to the adjusted operating frequency.

2. The method according to claim 1, wherein the control signal further comprises a payload length of the control command in the data packet, the information of the payload length being ordered between the header and the data packet, and before sampling the data packet, the method further comprises:
   reading data encoded after the header to obtain the payload length;

adjusting the sampling duration according to the payload length.

3. The method according to claim 1, wherein the operating frequency is encoded in the preamble in a binary format.

4. The method according to claim 2, wherein the process of adjusting the sampling duration comprises:
obtaining the data length of the data packet; and
adjusting sampling duration according to a ratio of the payload length to the data length of the data packet.

5. A terminal device, wherein the terminal device comprises:
one or more processors;
a storage device for storing one or more programs;
one or more processors are caused to implement the method of claim 1, when the one or more programs are executed by the one or more processors.

6. The terminal device according to claim 5, wherein the one or more processors further configured to implement the method of claim 2.

7. The terminal device according to claim 5, wherein the one or more processors further configured to implement the method of claim 3.

8. The terminal device according to claim 5, wherein the one or more processors further configured to implement the method of claim 4.

9. A non-transitory computer readable storage medium storing a computer program, wherein the program, when executed by a processor, implements the method of claim 1.

10. The non-transitory computer readable storage medium according to claim 9, wherein the program, when executed by the processor, further implements the method of claim 2.

11. The non-transitory computer readable storage medium according to claim 9, wherein the program, when executed by the processor, further implements the method of claim 3.

12. The non-transitory computer readable storage medium according to claim 9, wherein the program, when executed by the processor, further implements the method of claim 4.

* * * * *